United States Patent [19]

Coates et al.

[11] Patent Number: 5,621,552

[45] Date of Patent: Apr. 15, 1997

[54] ELECTROOPTICAL LIQUID CRYSTAL SYSTEM CONTAINING DUAL FREQUENCY LIQUID CRYSTAL MIXTURE

[75] Inventors: David Coates, Merley; Patrick Nolan, Poole Dorset, both of Great Britain

[73] Assignee: Merck Patent Gesellschaft Mit Beschrankter Haftung, Darmstadt, Germany

[21] Appl. No.: 199,193

[22] PCT Filed: Aug. 17, 1992

[86] PCT No.: PCT/EP92/01872

§ 371 Date: Feb. 28, 1994

§ 102(e) Date: Feb. 28, 1994

[87] PCT Pub. No.: WO93/05436

PCT Pub. Date: Mar. 18, 1993

[30] Foreign Application Priority Data

Aug. 29, 1991 [EP] European Pat. Off. ............... 91114515
Apr. 7, 1992 [EP] European Pat. Off. ............... 92105978

[51] Int. Cl.⁶ .................................................. H01L 29/04
[52] U.S. Cl. ................................................... 349/86
[58] Field of Search ................................... 359/52, 51

[56] References Cited

U.S. PATENT DOCUMENTS

| | | | |
|---|---|---|---|
| 4,688,900 | 8/1987 | Doane et al. | 359/91 |
| 4,944,576 | 7/1990 | Lacker et al. | 359/52 |
| 4,994,204 | 2/1991 | Doane et al. | 359/51 |
| 5,305,126 | 4/1994 | Kobayashi et al. | 359/51 |
| 5,372,745 | 12/1994 | Yoshinaga et al. | 359/52 |
| 5,437,811 | 8/1995 | Doane et al. | 359/91 |

FOREIGN PATENT DOCUMENTS 2206683  8/1990  Japan.

*Primary Examiner*—Sara W. Crane
*Assistant Examiner*—Fetsum Abraham
*Attorney, Agent, or Firm*—Millen, White, Zelano, & Branigan, P.C.

[57] ABSTRACT

The invention relates to an electrooptical liquid crystal system which contains a dual frequency liquid crystal mixture and a further optically transparent polymeric medium between two electrode layers which optionally may be attached to substrates, in which the ordinary refractive index of the liquid crystal mixture essentially agrees with the refractive index of the polymeric medium $n_m$ and/or in which the quotient of the mass of the liquid crystal mixture and of the mass of the polymeric medium is 1.5 or more, which has a reduced transmission in the on-state compared to the off-state, and which is obtained by polymerization of a composition containing the dual frequency liquid crystal mixture and a precursor of the polymeric medium, characterized in that an electrical field is applied during the curing process which exhibits a frequency below the crossover frequency of the dual frequency liquid crystal mixture so that the molecules of the dual frequency liquid crystal mixture are aligned essentially into the direction of the electrical field.

21 Claims, 4 Drawing Sheets

ELECTROOPTICAL LIQUID CRYSTAL SYSTEM CONTAINING DUAL FREQUENCY LIQUID CRYSTAL MIXTURE

The invention relates to an electrooptical liquid crystal system which contains a dual frequency liquid crystal mixture and a further optically transparent polymeric medium between two electrode layers which optionally may be attached to substrates, in which the ordinary refractive index of the liquid crystal mixture essentially agrees with the refractive index of the polymeric medium $n_m$ and/or in which the quotient of the mass of the liquid crystal mixture and of the mass of the polymeric medium is 1.5 or more, which has a reduced transmission in the on-state compared to the off-state, and which is obtained by polymerization of a composition containing the dual frequency liquid crystal mixture and a precursor of the polymeric medium.

Depending on the mass content of the liquid crystal mixture in the system, this can be embedded in the optical transparent medium in liquid crystal microdroplets which are separated to a greater or lesser extent from one another or else form a more or less coherent, continuous phase in which the optically transparent medium is present, for example, in the form of particles. A continuous phase is also obtained, for example, if the optically transparent medium forms a sponge-like, 3-dimensional network whose pores, in which the liquid crystal is located, merge into each other to a greater or lesser extent. The expression liquid crystal microdroplets here indicates small liquid crystal compartments separated from one another which, however, in no way have to have a spherical shape, but can be irregularly shaped and/or deformed.

If the optically transparent medium contains liquid crystal microdroplets, it is described in the following as a matrix; on the other hand, if a more or less continuous phase of the liquid crystal is present, the medium is described by the expression network.

NCAP and PDLC films (NCAP=nematic curvilinear aligned phases, PDLC=polymer dispersed liquid crystal) are examples of electrooptical liquid crystal systems in which the liquid crystal is embedded in the matrix in the form of microdrops. NCAP films are usually obtained by intimately mixing the encapsulated polymericmaterial, such as, for example, polyvinyl alcohol, the liquid crystal mixture and a carrier material, such as, for example, water, in a colloid mill. The carrier material is then removed, for example by drying. An appropriate process is described in U.S. Pat. No. 4,435,047. In contrast, the liquid crystal mixture is firstly homogeneously mixed with monomers or oligomers of the matrix-forming material in the preparation of PDLC films as described, for example, in U.S. Pat. No. 4,688,900, Mol. Cryst. Liq. Cryst. Nonlin. Optic, 157, 1988, 427–441, WO 89/06264 and EP 0,272,585. The mixture is then polymerized and the phase separation is induced (so-called PIPS technology; polymerization-induced phase separation). In addition, differentiations must further be made between TIPS (temperature-induced phase separation) and SIPS (solvent-induced phase separation) (Mol. Cryst. Liq. Cryst. Inc. Nonlin. Opt. 157 (1988) 427).

The PN system (PN=polymer network) described in EP 0,313,053 has a sponge-like network structure of the optically transparent medium. The content of the liquid crystal mixture in the material of the light-modulating layer is in general greater than 60% in systems of this type and is, in particular, between 70 and 90%. In order to prepare the PN systems, a mixture of the liquid crystal, monomers or oligomers of the material forming the 3-dimensional network and a polymerization initiator, in particular a photoinitiator, is customarily brought between 2 substrate plates provided with electrodes and then polymerized, for example by light irradiation.

The liquid crystal mixture in general has a positive dielectric anisotropy $\Delta\epsilon$ but the use of dielectrically negative liquid crystal mixtures (see, for example, WO 91/01511) or two-frequency liquid crystal mixtures the dielectrical anisotropy of which depends on the frequency of the addressing voltage (see, for example, N. A. Vaz et al., J. Appl. Phys. 65, 1989, 5043) is also discussed.

In microdroplet matrix systems, one of the refractive indices of the liquid crystal, customarily the ordinary refractive index $n_o$, is selected in such a way that it more or less coincides with the refractive index $n_m$ of the polymeric matrix. In the case of network systems, an adjustment of the refractive indices owing to the customarily very much higher liquid crystal content in the light-modulating layer is not absolutely necessary, but can be carried out to increase the light transmission and the contrast.

It is also possible to adjust a refractive index of the liquid crystal mixture other than $n_o$ to $n_m$ as is proposed, for example, in EP 0,272,585 where the extraordinary refractive index $n_e$ or the refractive index $n_x$, which the liquid crystal mixture exhibits at a completely random orientation, is adjusted to the refractive index of the matrix $n_m$. In WO 89/09807, the use of an optically anisotropic, for example, liquid crystalline polymeric matrix material has been proposed; in this case, both refractive indices of the liquid crystal mixture have to be adjusted to appropriate refractive indices of the matrix. For the sake of clarity, the following description is restricted to an isotropic polymeric medium with one refractive index $n_m$ which essentially matches with the ordinary refractive index of the liquid crystal mixture $n_o$. This does not mean, however, that the present invention is restricted to this type of matching and matrix material. The expert can find other embodiments of the electrooptical liquid crystal system according to the invention with other types of matching and/or with an anisotropic matrix resp. network material without any inventive effort on the basis of the following detailed description and the cited references, and these easily derivable embodiments are covered by the present invention though not explicitly mentioned.

An electrically switchable light scattering effect is observed in electrooptical liquid crystal systems which contain a dual frequency liquid crystal mixture and a further optically transparent polymeric medium between two electrode layers which optionally may be attached to substrates, in which the ordinary refractive index of the liquid crystal mixture essentially agrees with the refractive index of the polymeric medium $n_m$ and/or in which the quotient of the mass of the liquid crystal mixture and of the mass of the polymeric medium is 1.5 or more, which have a reduced transmission in the on,state compared to the off-state, and which are obtained by polymerization of a composition containing the dual frequency liquid crystal mixture and a precursor of the polymeric medium.

It is usually differentiated between normal mode electrooptical liquid crystal systems (NMS) and reverse mode electrooptical liquid crystal systems (RMS).

In NMS's, the liquid crystal molecules are statistically orientated in the off-state so that impinging light is strongly scattered and the system is non-transparent. On applying a voltage, the liquid crystal molecules are aligned parallel to the field and perpendicular to the E-vector of the transmitted light. Due to the adjustment of $n_o$ and $n_m$, perpendicular incident light now sees an optically isotropic medium and the systems appears transparent.

Contrary to this, RMS's exhibit a transparent off-state and an opaque on-state.

In WO 91/01511 it is proposed to use a dielectrically negative liquid crystal dispersed in a surfactant treated polymer matrix. The surfactant produces a homeotropic alignment of the liquid crystal molecules in the off-state which therefore is transparent. When applying a voltage, the liquid crystal molecules are orientated perpendicular to the direction of the electrical field which results in an opaque on-slate.

Another method to produce a RMS which is described in W. J. Doane, British Liquid Crystal Society Conference, Reading University, March 91, relies on dispersing the liquid crystal mixture in a liquid crystal polymer matrix. The liquid crystal can be aligned while curing in such a way as to match the liquid crystal polymer matrix and the system therefore appears transparent in the off-state.

U.S. Pat. No. 4,944,576 describes among other systems PDLC-films containing a dual-frequency liquid crystal mixture. The liquid crystal molecules are partially aligned by applying an electrical voltage during curing. Depending on the driving conditions, the cured systems can be rendered more transparent or more opaque.

A transparent off-state is advantageous in a variety of applications. To give an example, windows with an electrically switchable degree of transparency are preferably realized as RMS's because transparency is desired for most of the time; thus, a voltage would have to be applied to NMS's for most of the time which is disadvantageous because of high consumption of power and because of a reduced lifetime of the systems.

Though for many applications principally advantageous, the present RMS's are often rather complicated and/or characterized by an insufficient contrast and/or exhibit other short-comings.

The invention was thus based on the aim of making available electrooptical liquid crystal systems of the RMS type which do not have the disadvantages mentioned of conventional systems or only have them to a smaller extent. Other aims of the present invention are immediately evident to the person skilled in the art from the following detailed description.

It has been found that these aims can be realized by the electrooptical liquid crystal systems according to the present invention.

The invention thus relates to an electrooptical liquid crystal system which contains a dual frequency liquid crystal mixture and a further optically transparent polymeric medium between two electrode layers which optionally may be attached to substrates, in which the ordinary refractive index of the liquid crystal mixture essentially agrees with the refractive index of the polymeric medium $n_m$ and/or in which the quotient of the mass of the liquid crystal mixture and of the mass of the polymeric medium is 1.5 or more, which has a reduced transmission in the on-state compared to the off-state, and which is obtained by polymerization of a composition containing the dual frequency liquid crystal mixture and a precursor of the polymeric medium, characterized in that an electrical field is applied during the curing process which exhibits a frequency f below the cross-over frequency $f_c$ of the dual frequency liquid crystal mixture so that the molecules of the dual frequency liquid crystal mixture are aligned essentially into the direction of the electrical field.

The electrooptical system according to the invention can be used in architectural applications, sunroofs in automobiles, visors and cockpits.

The construction of the electrooptical system according to the present invention corresponds to the customary mode of construction for systems of this type. The term customary mode of construction is in this case broadly interpreted and includes all adaptions and modifications.

Thus, for example, in the case of PDLC or NCAP films, the matrix formed by the transparent medium in which the liquid crystal mixture is microdispersed or microencapsulated is arranged between conducting electrodes like a sandwich.

The electrodes are applied, inter alia, to substrate sheets of, for example, glass, plastic or the like; if desired, however, the matrix can also be provided directly with electrodes so that the use of substrates can be avoided. The electrodes can form a passive matrix or an active matrix, for example a transistor switch matrix (TFT-matrix), in order to enable multiplex driving schemes as is described in E. Kaneko, Liquid Crystal TV Displays, Tokyo, 1987.

In the case of network systems, the liquid crystal is located in the pores of the sponge-like, 3-dimensional network or the optically transparent medium is located in the form of small, for example spherical, particles in the liquid crystal. The network is customarily arranged between substrates provided with electrodes in order to prevent escape of the liquid crystal.

Both network systems and microdroplets matrix systems can be operated reflectively or transmissively so that at least one electrode and, if present, the associated substrates are transparent. Both systems oustomarily contain no polarizers, as a result of which a distinctly higher light transmission results. Furthermore, no orientation layers are necessary, which is a considerable technological simplification in the production of these systems compared with conventional liquid crystal systems such as, for example, TN or STN cells. The matrix or the 3-dimensional network are based, in particular, on isotropic thermoplastics, theromoset plastics and elastomers. Depending on the intended application, the systems obtained can be flexible, elastic or rigid.

A system based on a thermoplastic polymer and/or an elastomer can easily be deformed by the action of a mechanical stress at temperatures which are greater than the glass temperature of the matrix. This can be used, for example, in microdroplet matrix systems in order to freeze a specifically deformed shape of the droplets by cooling the matrix to temperatures below the glass temperature. Furthermore, for example, the matrix can be mechanically stretched at temperatures above the glass temperature or orientated by the action of electrical or magnetic fields, this orientation, which is maintained at temperatures below the glass temperature, causing optically anisotropic properties of the matrix.

While flexible and/or elastic systems are preferably based on the thermoplastic and/or elastomers, thermoset polymers are preferably used for the production of rigid systems. These can be deformed mechanically, for example, during hardening, the shape and arrangement of the microdroplets, for example, being fixed in the hardened matrix.

In the literature, there are various details about materials particularly suitable for the production of the matrix or of the network. Thus, for example, in U.S. Pat. No. 4,435,047 or in Liqiud Crystal, 3, (1988) 1543, water-soluble polymers are proposed, such as, for example, polyvinyl alcohol PVA or latex-like emulsions.

In U.S. Pat. Nos. 4,672,618, 4,673,255, 4,688,900, WO 85/04262 and in Mol. Cryst. Liq. Cryst. Inc. Nonlin. Opt. 157 (1988) 427, on the other hand, synthetic resins such as, for example, epoxy resins and polyurethanes which, for example, are thermally cured, are mentioned as suitable matrix materials.

EP 0,272,585 describes matrix or network materials based on photocurable vinyl compounds and WO 89/06264 proposes copolymers of multifunctional acrylates and multifunctional mercaptans. Other details about polymers which are suitable, in particular, for matrix systems are found, for example, in EP 0,165,063, EP 0,345,029, EP 0,357,234 or EP 0,205,261.

For the production of network system, a number of 3-dimensional cross-linkable monomers such as, for example, di- and tri-acrylates are mentioned in EP 0,313,053.

In addition, however, other materials can also be used for matrix and network systems.

The materials mentioned are intended to illustrate the invention only by way of example, but should in no case limit it. In principle, all transparent materials can be used which permit the production of the matrix or network structures for use in electrooptical liquid crystal system as described above.

Preferred embodiments of the electrooptical liquid crystal systems according to the invention are NCAP films, PDLC films and microdroplets matrix systems produced by modified processes. Processes for the production of these films are described, for example, in U.S. Pat. Nos. 4,688,900, 4,673,255, 4,671,618, WO 85/0426, EP 4,435,047, EP 0,272,595, Mol. Cryst. Liq. Cryst. Inc, Nonlin. Opt. 157 (1988) 427, Liquid Crystals, 3 (1988) 1543, EP 0,165,063, EP 0,345,029, EP 0,357,234 and EP 0,205,261.

A further preferred embodiment of the electrooptical systems according to the invention are the network systems whose production is described in EP 0,313,053. Included in the network systems here are also arrangements in which the transparent medium is dispersed in the form of individual, for example, spherical, particles in the liquid crystal, such as is described, for example, in GB 1,442,360.

However, in addition also those embodiments of the invention are included in which the transparent medium has a structure which lies between the network structure on the one side and the microdroplet matrix configuration on the other side. In addition, other embodiments of the invention not explicitly mentioned here are also included.

The thickness d of the electrooptical system d is customarily chosen to be small in order to achieve a threshold voltage $V_{th}$ which is as low as possible. Thus, for example, layer thicknesses of 0.8 and 1.6 mm are reported in U.S. Pat. No. 4,435,047, while values for the layer thickness between 10 and 300 µm are given in U.S. Pat. No. 4,688,900 and between 5 and 30 µm in EP 0,313,053. The electrooptical systems according to the invention only have layer thicknesses below 100 µm and especially below 50 µm are preferred.

The threshold voltage is also influenced by the size of the microdroplets or the mesh width of the network. Generally, relatively small microdroplets cause a relatively high threshold voltage $V_{th}$, but relatively short switching times $t_{on}$ or $t_{off}$ (U.S. Pat. No. 4,673,255). Experimental methods for influencing the average droplet size are described, for example, in U.S. Pat. No. 4,673,255 and in J. L. West, Mol. Cryst. Liq. Cryst. Inc. Nonlin. Opt., 157, 1988, 427. In U.S. Pat. No. 4,673,255, average drop diameters between 0.1 µm and 8 µm are given, while for example, a matrix which is based on a glass monolith has pores having a diameter between 15 and 2,000 Å. For the mesh width of the network of PN systems, a preferred range between 0.5 and 2 µm is given in EP 0,313,053.

An essential difference between the electrooptical liquid crystal system according to the present invention and those customary hitherto exists, however, in that a dual frequency liquid crystal mixture is used and an electrical field is applied during the curing of the composition containing the liquid crystal mixture and the precursor of the polymeric medium, whereby the electrical field exhibits a frequency f smaller than the cross-over frequency $f_c$ of the liquid crystal mixture so that the molecules of the liquid crystal mixture are aligned essentially into the direction of the electrical field.

It is the combination of these two characteristics which produces RMS's with a high transmission in the off-state, a high contrast and advantageous switching times.

Dual frequency liquid crystal mixtures exhibit a positive $\Delta \epsilon$ to a low frequency electrical field and a negative $\Delta \epsilon$ to a high electrical field where $\Delta \epsilon$ is given by $$\Delta \epsilon = \epsilon_\parallel - \epsilon_\perp$$

The frequency f at which $\Delta \epsilon$ changes from positive to negative is called the cross-over frequency $f_c$. Liquid crystal mixtures exhibiting a cross-over frequency of less than 15 kHz and especially not more than 10 kHz are preferred. Especially preferred are liquid crystal mixtures with a cross-over frequency of less than 3 kHz and in particular of not more than 1 kHz. For dual frequency liquid crystal mixtures with a low cross-over frequency, the effects of dielectrical heating are minimized (U.S. Pat. No. 4,946,263).

The cross-over frequency often increases with increasing temperature. Liquid crystal mixtures exhibiting a temperature coefficient of the cross-over frequency of less than 10 Hz/K and especially 5 Hz/K are preferred.

The liquid crystal mixture preferably exhibits a dielectrical anisotropy of more than +2 and especially of more than +5 at low frequencies ($f<f_c$) resp. of less than −2 and especially less than −5 at high frequencies ($f>f_c$). Liquid crystal mixtures for which the change in dielectric constant from its maximum positive value to its maximum negative value occurs in a frequency range of less than 500 Hz and especially of not more than 300 Hz are preferred. In order to optimize switching times, the dual frequency liquid crystal mixture is preferably chosen in such a way than its perpendicular dielectric constant at high frequencies f>$f_c$ matches more or less with the dielectrical constant of the polymer (cf. J. Kelly et al., SPIE Vol. 1257, Liquid Crystal Displays and Applications, 1990, 17).

Dual-frequency liquid crystal mixtures are described in literature in some detail (see, for example, M. Schadt, Appl. Phys. Lett., 41 (1982), 697 and M. Schadt, Japan Display 83, October 1983, 220–23). A suitable mixture concept for dual-frequency mixtures is disclosed, for example, in U.S. Pat. No. 4,783,280 and the mixtures described there are preferably used in the systems according to the present invention. The electrooptical liquid crystal system according to the invention can also be operated, however, with other dual-frequency liquid crystal mixtures; the working principle of the system according to the invention is rather generally valid and is particularly not restricted to a specific type of dual-frequency liquid crystal mixture.

In order to produce the liquid crystal system according to the present invention, the dual frequency mixture is thoroughly mixed with the precursor of the polymeric medium. The precursor generally contains monomers, oligomers and/or prepolymers of the polymer medium, optionally together with a polymerization initiator as was explained above. This composition comprising the dual frequency mixture and the precursor of the polymeric medium may contain additional components such as one or more perchloric dyes, chiral compounds and surfactants. Electrooptical systems according to the invention the dual frequency liquid crystal mixture of which contains one or more chiral compound are characterized by a transparent off-state and a colored scattering on-state; these systems are preferred.

The precursor of the polymeric medium is conventional and can be selected from the materials enumerated above; especially preferred are usually photoradically curable precursors being based on vinylchloride, vinylidenchloride, acrylnitriles, methacrylnitriles, acrytamides, methacrylamides, methyl-, ethyl-, n- or tert.butyl-, cyclohexyl, 2-ethylehtyl-, phenyloxyethyl-, hydroxyethyl-, hydroxypropyl, 2-5 C-alkoxyethyl-, tetrahydrofurfurylacralytes or -methacrylates, vinylacetates, -proprionates, -acrylates, -succinates, N-vinylpyrrolidones, N-vinylcarbazoles, styroles, divinylbenzenes, ethylendiacrylates, 1,6-hexandioldiacrylates, bisphenol-A-diacrylates and -dimethacrylates, trimethylolpropandiacrylates, pentaerythritoltriacrylates, triethylenglycoldiacrylates, ethylenglycoldimethacrylates, triethylenglycoldiacrylates, ethylenglycoldimethacrylates, triproplyneglycoltriacrylates, pentaerythritoltriacrylates, pentaerythritoltetraacrylates, ditrimethylpropanetetraacrylates or dipentaerythritolpenta- or hexaacrylates.

Also thiol-ene systems are preferred like, for example, the commercially available product Norland 65 (Norland Products).

This enumeration is intended to be illustrative without limiting the scope of the invention. Suitable photoinitiators are described, for example, in DE 41 02 215.

The composition containing the dual frequency mixture, the precursor of the polymeric medium and, optionally, further components is thoroughly mixed to form a complete isotropic solution or a dispersion by application of ultrasonic, by using a colloid mill or by other methods and subsequently, it is injected between the electrode layers which are usually attached to glass substrates.

After the injection, a voltage with a frequency below the cross-over frequency $f_c$ of the dual frequency mixture is applied to the electrodes aligning the liquid crystal molecules essentially perpendicular to the electrode plates. The voltage is maintained during the curing of the precursor which is effected by heating or irradiating the system or by other means. The frequency of the voltage applied during the curing is usually chosen to be below $f_c/2$ but other values of the frequency are also possible.

The amplitude of the voltage applied during the curing must be chosen sufficiently high so that the molecules are aligned essentially perpendicular to the electrode plates; the amplitude depends on the respective properties of the system but usually it is not less than 20 V.

Surprisingly it turned out that after the curing has finished the liquid crystal molecules remain in the perpendicular aligned state even if the voltage is switched off. This is schematically visualized in FIG. 1 where the performances of a conventional NMS (FIG. 1a) and a RMS type system according to the invention (FIG. 1b) are shown schematically.

Figure 1A:
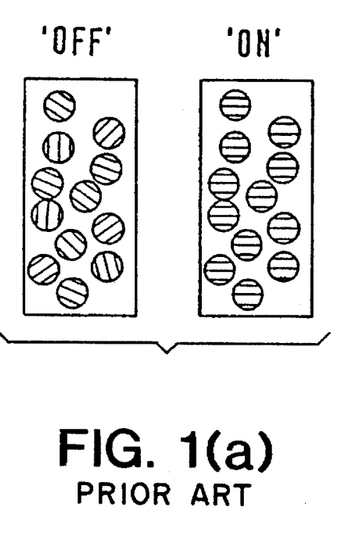
FIG. 1(a) illustrates the "on" and "off" arrangement of liquid-crystalline molecules in a conventional normal-mode electrooptical liquid-crystal system (NMS)

In the off-state of a NMS, the nematic director within the droplets is randomly orientated from droplet to droplet and light impinging on the device is scattered thus rendering the device opaque; when applying a voltage, the molecules are aligned vertically to the electrode layers, and the on-state is transparent.

Figure 1B:
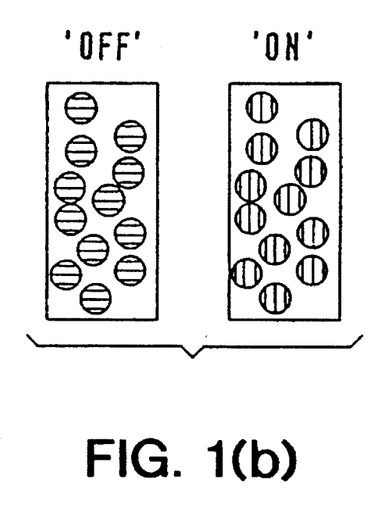
FIG. 1(b) illustrates the "on" and "off" arrangement of liquid-crystalline molecules in a reverse mode electrooptical liquid-crystal system (RMS)

Contrary to this, in a RMS type system according to the invention, the liquid crystal molecules are aligned essentially perpendicular to the electrode layers in the transparent off-state. The alignment produced by applying a voltage with f<$f_c$ during the curing process is rather good or even good so that a high or relatively high transmittance is obtained. The system is switched to the on-state by applying a voltage with f>$f_c$ and the liquid crystal molecules are orientated essentially parallel to the electrode layers. Light impinging perpendicular now sees at the phase boundary of the polymeric medium/dual-frequency liquid crystal mixture a change of the refractive index of $$|n_e - n_m|.$$

This means that scattering is very effective in the on-state of the electrooptical system of the present invention because the maximum possible difference of the refractive indices is used. Contrary to this, the scattering state of the NMS is characterized by a statistical orientation of the liquid crystal molecules resulting in a less effective scattering.

The dual-frequency liquid crystal mixtures employed in the systems according to the present invention shall be termed as nematic, cholesteric or smectic if they exhibit in the preferred working temperature range around room temperature a nematic, cholesteric or smectic phase; the term smectic phase comprises $S_A$ and $S_C$ phase dual-frequency mixtures, both tilted and not tilted.

Electrooptical liquid crystal systems according to the present invention containing a nematic liquid crystal mixture are generally especially preferred.

Cholesteric liquid crystal mixtures can be obtained by using at least one chiral liquid crystalline compound as constituent of the liquid crystal mixture and/or by doping a nematic liquid crystal mixture with a small amount of a non-liquid crystalline doping component of typically less than 10% and in particular, not more than 5% by weight with respect to the mass of the liquid crystal mixture. Suitable dopants are described in literature (see, for example, DE 28 27 471, DE 33 33 677, DE 34 25 503) and/or are commercially available (for example, CB15, S-811-, R-811, S-1011, R-1011, all available through E. Merck, Germany). The doping component can consist of one or more dopants the latter preferably exhibiting an absolute value of the helical twisting power of at least 7 $\mu m^{-1}$ at 20° C.

Incorporating a cholesteric dual frequency mixture in an electrooptical system according to the present invention allows the realization of colored RMS systems. Applying a low frequency voltage ($f<f_c$, in particular $f<f_c/2$) during curing of the precursor of the PDLC film results in an essentially homeotropic alignment of the liquid crystal molecules within the droplets which remains after switching off the voltage; the system therefore appears transparent in the off-state. A homogenous alignment is induced by applying a voltage with $f>f_c$, and the system appears colored in the on-state because of the cholesteric nature of the liquid crystal mixture. It is possible to produce a different coloration of the on-state by adding different amounts of the doping component to the dual frequency liquid crystal mixture and/or by varying the applied voltage below the saturation voltage.

Colored RMS systems containing a cholesteric dual-frequency mixture exhibit highly desirable properties and these systems are also especially preferred.

Colored RMS systems according to the present invention can also be obtained by adding a small amount of a pleochroic dye to a nematic or cholesteric liquid crystal mixture. Applying a low-frequency voltage during curing of the precursor of the PDLC film ($f<f_c$, in particular $f<f_c/2$) gives a permanent and essentially homeotropic alignment of the nematic host. The homeotropic alignment is also imparted onto the pleochroic dye, and the off-state of the system (no voltage applied) is transparent. In the on-state (voltage with $f>f_c$), the pleochroic dye molecules are oriented homogeneously together with the host and the system appears to be colored.

The term "pleochroic dye" comprises dye components containing one or more dye compounds; suitable pleochroic dyes are described in literature (see, for example DE 34 33 708, DE 30 40 102, DE 30 36 895, DE 31 15 762, DE 29 50 944, H. Kelker, R. Hatz, Handbook of Liquid Crystals, Verlag Chemie, Weinheim 1980) and/or they are commercially available.

Colored RMS systems containing a pleochroic dye are preferred.

The present inventors further found out that bistable RMS systems can be obtained by employing a dual-frequency smectic liquid crystal mixture. Mixtures of this type are found to be essentially homeotropically aligned on applying a low frequency voltage ($f<f_c$, in particular $f<f_c/2$) and they remain homeotropically aligned on removal of the low frequency voltage; on applying a high frequency voltage ($f>f_c$) they become essentially homogeneously aligned and they remain homogeneously aligned on removal of the high frequency voltage, i.e., they are bistable. Dual frequency smectic liquid crystal mixtures are described in literature; see, for example, Mol. Cryst. Liq. Cryst. Letters, 49 (1978), p. 83.

Using liquid crystal mixtures of this type in electrooptical systems according to the present invention yields bistable RMS systems. The essentially homeotropic orientation of the off-state can be enhanced by applying a low frequency voltage ($f<f_c$, in particular $f<f_c/2$) during the curing of the precursor of the PDLC film but this is not absolutely necessary. Because of their bistability, the systems can be switched from one state to the other by use of a single voltage pulse. This results in a considerably reduction of power consumption compared with other RMS type systems according to the present invention where a constant voltage supply is necessary in the on-state. A further advantage is that the problem of holding ratio is also greatly reduced.

Electrooptical systems according to the present invention containing a dual frequency smectic liquid crystalline mixture are preferred.

It was found out further by the present inventors that the off-state transmission of the electrooptical system according to the present invention can considerably be increased if one or more reactive liquid crystalline compounds are added to the dual frequency liquid crystal mixture prior to curing. This is especially true for nematic and cholesteric dual frequency liquid crystalline mixtures but an improvement was also found for smecitc dual frequency liquid crystal mixtures.

Reactive liquid crystalline compounds are described quite generally by formula I wherein —□— is a rod-like, mesogenic structure, and at least one of R' and R" is a reactive group containing one or more reaction sites.

Examples for reactive groups with two reaction sites are, for example, the vinyl group $CH_2=CH-$, the (meth)acrylate group or the styrene group Examples for reactive groups with one reaction site are the hydroxyl group OH—, the thiol group SH—, the amino group $NH_2$— or the isocyanate group $O=C=N-$.

In a preferred embodiment of the electrooptical systems according to the present invention, at least one of R' and R" is or contains an ene-group Preferred examples of reactive liquid crystalline compounds are the diacrylates of formula I wherein R1 is H or $CH_3$, Z is independently from one another —COO— or —OCO—, A is a flexible spacer chosen from the group consisting of $(-CH_2-)_x$, $(-CH_2-)_xO-$, (—Si(CH$_3$)$_2$—O)$_x$ with x=1–15, or (—CH$_2$—CH$_2$—O)$_y$ with y=1–8, which are described in EP 0,261,712.

The reactive liquid crystalline component which dissolves in the dual frequency liquid crystalline mixture preferably contains 1–10 and, in particular, 1–5 reactive liquid crystalline compounds. The percentage of the reactive liquid crystalline component with respect to the mass of the dual frequency liquid crystal mixture preferably amounts to 0.01–25% and, in particular, to 0.1–15%.

During the curing process, the reactive liquid crystalline molecules are aligned together with the molecules of the dual frequency liquid crystal mixture by applying a voltage with f<f$_c$. It is assumed that the reactive liquid crystalline molecules react with each other and/or with the polymeric matrix resp. polymeric network during curing thus forming some kind of internal structure within the liquid crystal phase which supports and favors a homeotropic alignment of the molecules of the dual frequency livid crystal mixture in the off-state of the elctrooptical systems.

The result observed is a considerable increase of the off-state transmission of the electrooptical system. Adding, for example, 2% of to the liquid crystal mixture of the system described in example 1, gives a system with an off-state transmission of 76%.

The mechanisms proposed above as an explanation for the observed increase of the off-state transmission is to be understood as a hypothesis, and the scope of the present invention is not restricted by this explanation.

Electrooptical systems according to the present invention containing a reactive liquid crystalline component, are especially preferred.

The transparent off-state of the electrooptical system according to the invention is characterized by a rather high or high degree of orientation of the liquid crystal molecules. This leads together with the highly orientated on-state to a high or very high contrast of the electrooptical liquid crystal system according to the invention. The contrast for the direction of observation perpendicular to the substrates can always be improved by using a high Δn liquid crystal mixture. At the same time, however, off-axis haze is considerably enhanced resulting in a drastically reduced contrast for oblique directions of observation. Due to its operation principle, the system according to the present invention is characterized by a high or even very high contrast so that liquid crystal mixtures with a lower Δn can be used to obtain the same contrast for a perpendicular observation as with a conventional NMS with a higher Δn which is advantageous with respect to the contrast at oblique directions of observation. The dual frequency liquid crystal mixture preferably exhibits an optical anisotropy Δn of more than 0.08 especially of not less than 0.10 and in particular of more than 0.12.

The contrast of the system according to the invention sometimes can be slightly increased by applying a low-frequency voltage with f<f$_c$ in the off-state in order to improve the homeotropic alignment; this improvement is, however, at any rate only small and often negligible and the application of a voltage in the off-state is usually omitted.

The electrooptical liquid crystal system according to the invention is a reverse mode type system which can be prepared rather easily analogous to well-known methods of production of conventional NMS's. The system according to the invention exhibits a high or very high contrast and advantageous switching times and shows the shortcomings of the known RMS's only to a lesser extent. The system according to the invention is thus of considerably economic importance.

The following examples are intended to illustrate the invention without limiting it.

EXAMPLE 1 a) Preparation of an electrooptical system according to the invention

A dual frequency liquid crystal, which consists of

24% of 4-pentylphenyl 2-chloro-4-(4-propyl-phenyl-carbonyloxy)-benzoate

32% of 4-pentylphenyl 2-chloro-4-(4-pentyl-phenyl-carbonyloxy)-benzoate

7% of 4-(trans-4-propylcyclohexyl)-4'-(trans-4-pentylcyclohexyl)-biphenyl

9% of 2-fluoro-4-pentylphenyl trans-4-propylcyclohexyl-carboxylate

15% of 2-fluoro-4-pentylphenyl trans-4-pentylcyclohexyl-carboxylate

13% of 2-fluoro-4-pentylphenyl trans-4-heptylcyclohexyl-carboxylate and exhibits the following physical data:

| | |
|---|---|
| clearing point Tc | 101° C. |
| birefingence Δn | 0.12 (589 nm, 20° C.) |
| ordinary refractive index n$_o$ | 1.52 (589 nm, 20° C.) |
| dielectrical anisotropy Δε (100 Hz) | +2.95 |
| dielectrical anisotropy Δε (40 kHz) | −1.8 |
| cross-over frequency f$_c$ | 5.1 kHz (20° C.) | is mixed with the adhesive NOA 65 (Norland Products) which can be cured by UV irradiation, in the ratio of 1:1 to give a homogeneous isotropic solution; the refractive index of the cured NOA 65 is n$_m$=1.52. The solution is capillary filled between 2 transparent glass substrates which are provided with electrode layers made from indium tinoxide; the thickness of the system amounts to 15 μm. Subsequent to the filling, a voltage (V$_{rms}$=100 V, f=50 Hz) is applied to the electrodes. The system is then exposed for 2 min to an Argon lamp (0.5 mW/cm$^2$). The matrix system obtained is transparent in the field-free off-state.

The curing procedure is repeated for the same system but under different conditions using a 20 mW/cm$^2$ low pressure mercury lamp for 30 sec. The system obtained is also transparent in the off-state but is characterized by smaller droplets of the dual-frequency liquid crystal mixture.

b) Electrooptical measurements

Figure 2:
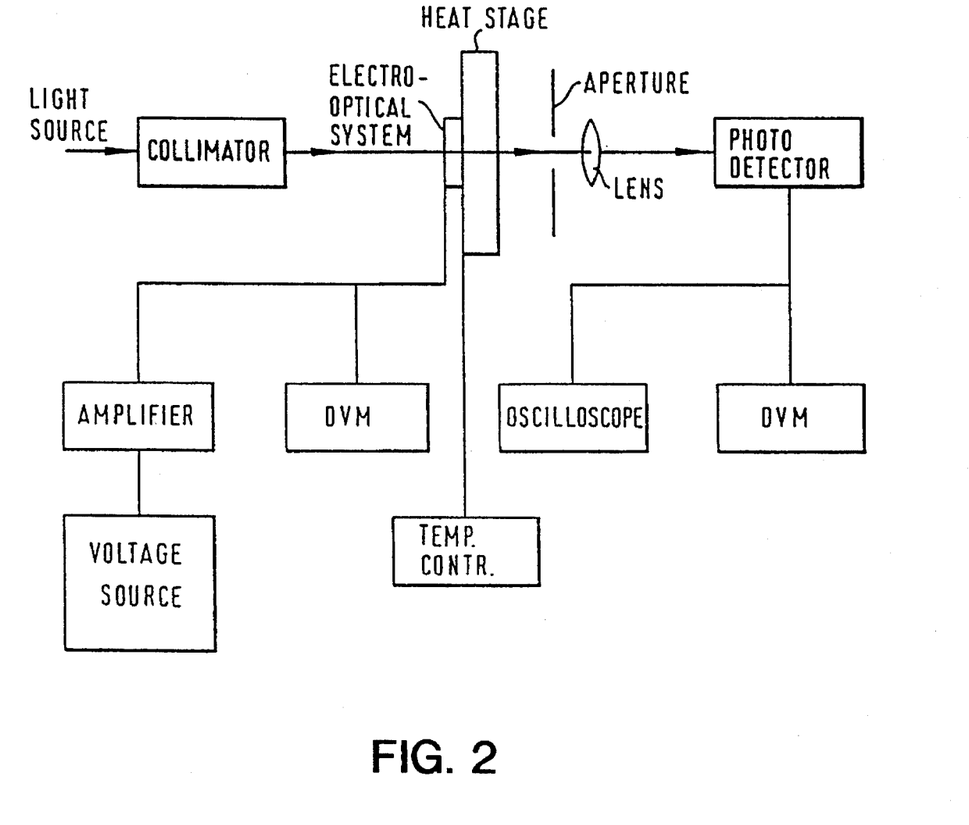
FIG. 2 illustrates a system set up for measuring electrooptical performance.

The electrooptical performance of the system described in a) is measured with the set-up shown in FIG. 2. The system is held in a temperature controlled heat stage of an electrooptical bench. The light source used is a filtered tungsten halogen lamp. Light traversing the electrooptical system is focused onto a photodetector using a short focal length lens with a collection angle of 3.4°. The voltage source is capable of producing up to 160 V$_{rms}$ in the frequency range of 0.01

Hz–100 kHz. The photodetector output is recorded on a digital voltmeter (DVM).

Figure 3:
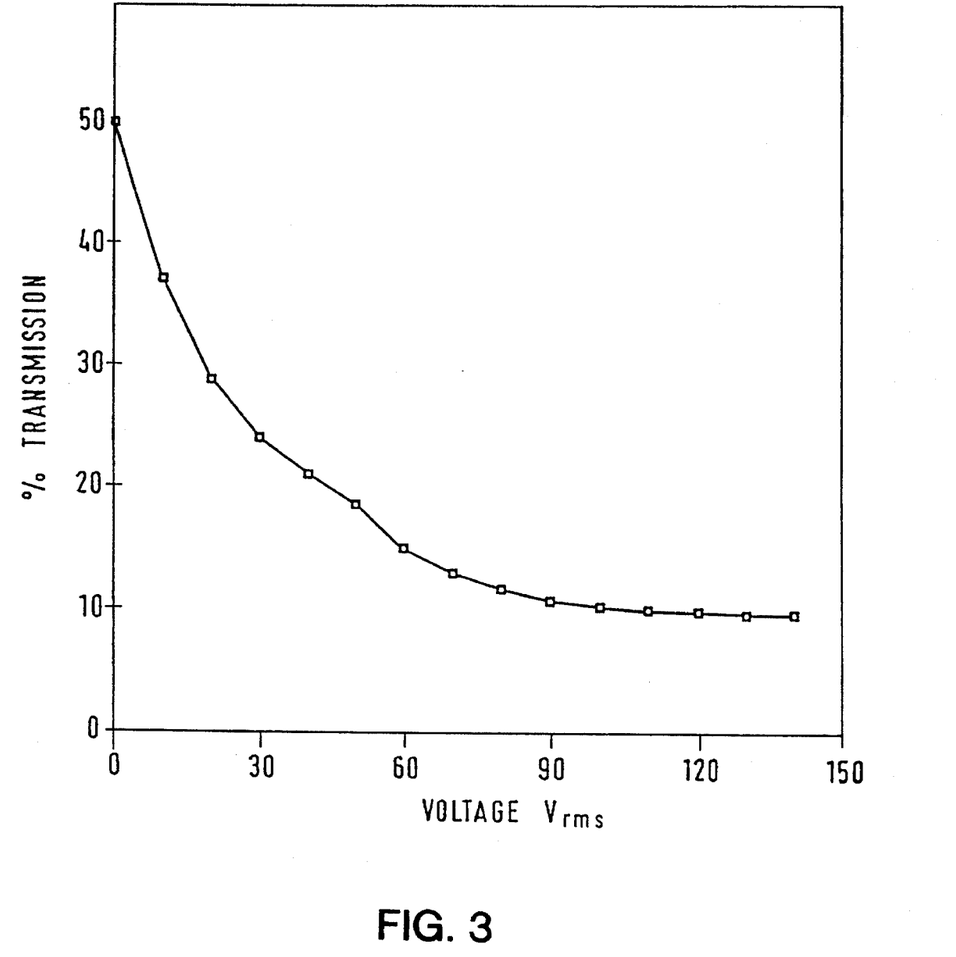
FIG. 3 illustrates a graph of percent transmission versus voltage ($V_{rms}$)

The electrooptical measurements are carried out at 20° C. In the off-state no voltage is applied and the voltage applied in the on-state exhibits a frequency of f=10 kHz. FIG. 3 shows a plot of transmission vs. voltage. The transmission varies between 50% and about 10% and reaches a saturation value for about 90 $V_{rms}$; the transmission recorded in the set-up of FIG. 2 without inserting an electrooptical system is set to be 100%.

EXAMPLE 2 a) Preparation of an electrooptical system according to the invention

A dual frequency liquid crystal, which consists of

| 40.0% of | 4-pentylphenyl 2-chloro-4-(4-propyl-phenyl-carbonyloxy)-benzoate |
| 40.0% of | 4-pentylphenyl 2-chloro-4-(4-pentyl-phenyl-carbonyloxy)-benzoate |
| 3.15% of | 4-propylphenyl trans-4-propylcyclohexyl-carboxylate |
| 3.85% of | 4-pentylphenyl trans-4-propylcyclohexyl-carboxylate |
| 3.00% of | 4-heptylphenyl trans-4-propylcyclohexyl-carboxylate |
| 10.0% of | 1-[4-(4-pentylphenyl)-phenyl]-2-(2,3-difluoro-4-ethoxyhenyl)-ethane | and exhibits the following physical data:

| clearing point Tc | 101° C. |
| birefringence Δn | 0.12 (589 nm, 20° C.) |
| ordinary refractive index $n_o$ | 1.51 (589 nm, 20° C.) |
| dielectrical anisotropy Δε (100 Hz) | +5.0 |
| dielectrical anisotropy Δε (40 kHz) | −2.5 |
| cross-over frequency $f_c$ | 2.5 kHz (20° C.) | is mixed with the precursor of the matrix, consisting of
20% of 2-ethyl-hexanol-acrylate,
20% of hexanedioldiacrylate, and
60% NOA 65
and with the reactive liquid crystalline compound in a mass ratio of 50:48:2 to give a homogeneous isotropic solution.

The solution is capillary filled between 2 transparent glass substrates which are provided with electrode layers made from indium tin oxide; the thickness of the system amounts to 15 μm. Subsequent to the filling, a voltage ($V_{rms}$=100 V, f=100 Hz) is applied to the electrodes. The system is then exposed for 30 min to an UV lamp (Suntest, 3 mW/cm$^2$) at a distance of 2 cm.

One obtains a matrix system which is transparent in the field-free off-state; the system is termed as system 2/1.

For the sake of comparison, a second matrix system termed as 2/2 is prepared exhibiting the same composition as system 2/1 with the difference that the reactive liquid crystalline compound is omitted; the precursor of the matrix of system 2/2 thus consists of the liquid crystal mixture and the precursor of the matrix given above for 2/1 in a ratio of 1:1, and the same curing procedure was applied.

b) Electrooptical measurements

Figure 4:
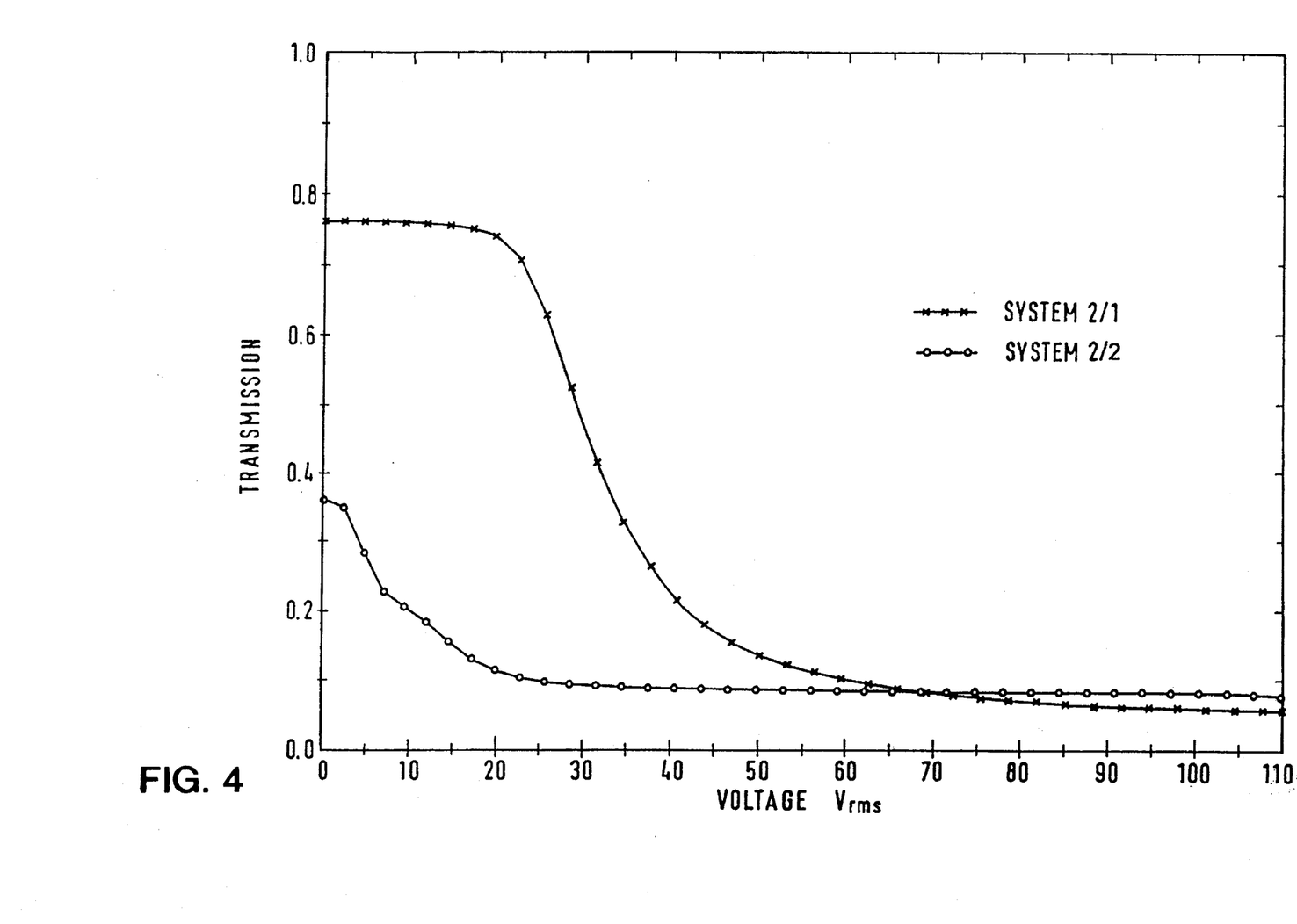
FIG. 4 illustrates a graph of transmission versus voltage for matrix systems 2/1 and 2/2 of Example 2.

FIG. 4 shows a plot of transmission vs. voltage for both systems 2/1 and 2/2 recorded with the electrooptical set-up shown in FIG. 2. In the off-state no voltage is applied and the voltage applied in the on-state exhibits a frequency of 10 kHz.

The transmission varies between about 75% and 5% for system 2/1 and between about 38% and 8% for system 2/2. System 2/2 exhibits a lower value of saturation voltage of about 25 $V_{rms}$ compared to about 65 $V_{rms}$ for system 2/1. The transmission recorded in the set-up of FIG. 2 without inserting an electrooptical system is set to be 1.

In examples 1 and 2, the terms on- and off-state are to be understood as electrical on- and off-states, i.e. voltage on or off; the electrical on-state corresponds to the optical off-state and vice versa.

We claim:

1. An electrooptical liquid crystal system comprising:
   a dual frequency liquid crystal mixture having a cross-over frequency $f_c$ and an optically transparent polymeric medium positioned between two electrode layers, said layers each being optionally attached to substrates;
   wherein the ordinary refractive index of said liquid crystal mixture essentially agrees with the refractive index of said polymeric medium $n_m$, the quotient of the mass of said liquid crystal mixture and of the mass of the polymeric medium is 1.5 or more, or said ordinary refractive index of said liquid crystal mixture essentially agrees with the refractive index of said polymeric medium $n_m$ and said quotient is 1.5 or more;
   wherein said system has a reduced transmission in the on-state compared to the off-state;
   wherein said system is obtained by polymerization of a composition containing said dual frequency liquid crystal mixture and a precursor of said polymeric medium; and
   during curing of said composition, an electrical field exhibiting a frequency below said cross-over frequency $f_c$ of said dual frequency liquid crystal mixture is applied to said composition whereby the molecules of said dual frequency liquid crystal mixture are aligned essentially in the direction of said electrical field.

2. An electrooptical system according to claim 1, wherein said composition further contains less than 25% by weight with respect to the mass of said liquid crystal mixture of one or more reactive liquid crystalline compounds containing one or more polymerizable groups.

3. An electrooptical liquid crystal system according to claim 2, wherein said composition further contains 0.1–15% by weight with respect to the mass of said liquid crystal mixture of one or more reactive liquid crystalline compounds containing one or more polymerizable groups.

4. An electrooptical system according to claim 1, wherein said dual frequency liquid crystal mixture is a nematic liquid crystal mixture.

5. An electrooptical system according to claim 1, wherein said dual frequency liquid crystal mixture is a cholesteric mixture.

6. An electrooptical system according to claim 1, wherein said dual frequency liquid crystal mixture is a smectic mixture.

7. In an automobile having a sunroof wherein said sunroof comprises an electrooptical liquid crystal system, the improvement wherein said system is an electrooptical liquid crystal system according to claim 1.

8. An electrooptical liquid crystal system according to claim 1, wherein the frequency of said electrical field is less than $f_c/2$.

9. An electrooptical liquid crystal system according to claim 1, wherein said liquid crystal mixture has a cross-over frequency $f_c$ of not more than 10 kHz.

10. An electrooptical liquid crystal system according to claim 1, wherein said liquid crystal mixture has a cross-over frequency $f_c$ of less than 3 kHz.

11. An electrooptical liquid crystal system according to claim 1, wherein said liquid crystal mixture exhibits a temperature coefficient of the cross-over frequency of less than 10 Hz/K.

12. An electrooptical liquid crystal system according to claim 1, wherein said liquid crystal mixture exhibits a dielectric anisotropy of more than +2 at frequencies below the cross-over frequency.

13. An electrooptical liquid crystal system according to claim 1, wherein said liquid crystal mixture exhibits a dielectric anisotropy of less than −2 at frequencies above the cross-over frequency.

14. An electrooptical liquid crystal system according to claim 1, wherein the dielectric constant of said liquid crystal mixture changes from its maximum positive value to its maximum negative value in a frequency range of less than 500 Hz.

15. An electrooptical liquid crystal system according to claim 1, wherein said composition further contains one or more pleochroic dyes, one or more chiral compounds, one or more surfactants, or mixtures thereof.

16. An electrooptical liquid crystal system according to claim 1, wherein said liquid crystal mixture exhibits an optical anisotropy $\Delta n$ of more than 0.08.

17. An electrooptical liquid crystal system according to claim 1, wherein said liquid crystal mixture exhibits an optical anisotropy $\Delta n$ of not less than 0.1.

18. An electrooptical liquid crystal system according to claim 1, wherein the thickness of said dual frequency liquid crystal mixture and optically transparent polymeric medium between said two electrode layers is less than 100 μm.

19. An electrooptical liquid crystal system according to claim 1, wherein said liquid crystal mixture has a cross-over frequency $f_c$ of not more than 5.1 kHz.

20. A process for preparing of an electrooptical liquid crystal system comprising:

inserting a composition containing a dual frequency liquid crystal mixture, a precursor of an optically transparent polymeric medium, and optionally a reactive liquid crystalline component between electrode layers, said electrode layers each being optionally attached to substrates;

said dual frequency liquid crystal mixture having a cross-over frequency $f_c$;

wherein the ordinary refractive index of said liquid crystal mixture essentially agrees with the refractive index of said polymeric medium $n_m$, the quotient of the mass of said liquid crystal mixture and of the mass of the polymeric medium is 1.5 or more, or said ordinary refractive index of said liquid crystal mixture essentially agrees with the refractive index of said polymeric medium $n_m$ and said quotient is 1.5 or more;

applying a voltage to said electrode layers, said voltage exhibiting a frequency below said cross-over frequency $f_c$ of said dual frequency liquid crystal mixture whereby the molecules of said dual frequency liquid crystal mixture are aligned essentially in the direction of the electrical field formed by the application of said voltage; and polymerizing said precursor while maintaining said electrical field, to obtain said system wherein said system has a reduced transmission in the on-state compared to the off-state.

21. An electrooptical liquid crystal system comprising:

a dual frequency liquid crystal mixture having a cross-over frequency $f_c$ and an optically transparent polymeric medium positioned between two electrode layers, said layers each being optionally attached to substrates;

wherein the ordinary refractive index of said liquid crystal mixture essentially agrees with the refractive index of said polymeric medium $n_m$, the quotient of the mass of said liquid crystal mixture and of the mass of the polymeric medium is 1.5 or more, or said ordinary refractive index of said liquid crystal mixture essentially agrees with the refractive index of said polymeric medium $n_m$ and said quotient is 1.5 or more;

wherein said system exhibits its highest transmission in the off-state and reduced transmission in the on-state;

wherein said system is obtained by polymerization of a composition containing said dual frequency liquid crystal mixture and a precursor of said polymeric medium; and during curing of said composition, an electrical field exhibiting a frequency below said cross-over frequency $f_c$ of said dual frequency liquid crystal mixture is applied to said composition whereby the molecules of said dual frequency liquid crystal mixture are aligned essentially in the direction of said electrical field.

\* \* \* \* \*